United States Patent
Anderson et al.

(10) Patent No.: US 10,213,015 B1
(45) Date of Patent: Feb. 26, 2019

(54) PNEUMATIC ASSIST ADJUSTABLE TABLE

(71) Applicant: Ditto Sales, Inc., Jasper, IN (US)

(72) Inventors: Brian Anderson, Beford, IN (US);
Chris Dewig, Haubstadt, IN (US); Matt Johnson, Grand Havens, IN (US);
Chuck Wagner, Jasper, IN (US)

(73) Assignee: Ditto Sales, Inc./Versteel, Jasper, IN (US)

( * ) Notice: Subject to any disclaimer, the term of this patent is extended or adjusted under 35 U.S.C. 154(b) by 0 days.

(21) Appl. No.: 15/958,263

(22) Filed: Apr. 20, 2018

(51) Int. Cl.
| | | |
|---|---|---|
| A47B 9/20 | (2006.01) | |
| A47B 13/00 | (2006.01) | |
| A47B 13/02 | (2006.01) | |
| F16M 11/04 | (2006.01) | |
| F16M 11/12 | (2006.01) | |

(52) U.S. Cl.
CPC .............. *A47B 13/003* (2013.01); *A47B 9/20* (2013.01); *A47B 13/02* (2013.01); *F16M 11/046* (2013.01); *F16M 11/126* (2013.01); *A47B 2200/0042* (2013.01)

(58) Field of Classification Search
CPC ............ A47B 13/003; A47B 2013/006; A47B 2013/022; A47B 9/10; A47B 9/20; A47B 2200/0042; F16M 11/126
See application file for complete search history.

(56) References Cited

U.S. PATENT DOCUMENTS

| | | | | |
|---|---|---|---|---|
| 4,248,161 A | * | 2/1981 | Adair | A47B 27/02 108/6 |
| 4,440,096 A | * | 4/1984 | Rice | A47B 9/04 108/147 |
| 6,637,352 B1 | * | 10/2003 | Thode | A47B 3/08 108/115 |
| 7,703,400 B2 | * | 4/2010 | Mockel | A47B 3/0803 108/115 |
| 7,878,128 B2 | * | 2/2011 | Watson | A47B 3/0803 108/115 |
| 8,051,785 B2 | * | 11/2011 | Lin | A47B 7/02 108/115 |
| 8,069,795 B1 | * | 12/2011 | Williams | A47B 3/00 108/115 |
| 8,104,787 B2 | * | 1/2012 | Haley | B62B 3/108 108/115 |

(Continued)

*Primary Examiner* — Daniel J Rohrhoff
(74) *Attorney, Agent, or Firm* — Maginot, Moore & Beck, LLP

(57) ABSTRACT

A table includes a table top having an underside, a top structure, a base structure, and a control mechanism. The top structure is attached to the table top and includes hollow supports cylinders arranged parallel to each other and a top support bar configured to support a tilt assembly. The support cylinders extend downwardly away from the table top. The base structure includes hollow legs extending upwardly and configured to receive at least a portion of the support cylinders. The control mechanism is operably connected to movement mechanisms disposed within the support cylinders and the legs. The control mechanism is configured to directly and simultaneously control each movement mechanism so as to raise and lower the support cylinders relative to the legs. The tilt assembly is affixed to the underside and to the top support bar and is configured to pivot about a pivot axis.

14 Claims, 13 Drawing Sheets

(56) References Cited

U.S. PATENT DOCUMENTS

| | | | |
|---|---|---|---|
| 8,291,830 B2 * | 10/2012 | Rutz | A47B 3/0818 108/115 |
| 8,297,208 B2 | 10/2012 | Hoffman | |
| 2005/0275322 A1 * | 12/2005 | Mosel | A47B 9/20 312/312 |
| 2007/0261611 A1 * | 11/2007 | Kumazawa | A47B 3/0815 108/115 |
| 2008/0149002 A1 * | 6/2008 | Gardner | A47B 3/08 108/6 |
| 2011/0017107 A1 * | 1/2011 | Ko | A47B 3/0818 108/64 |
| 2013/0284076 A1 * | 10/2013 | Okuda | A47B 3/08 108/115 |
| 2013/0305966 A1 | 11/2013 | Hendershot et al. | |
| 2015/0033990 A1 * | 2/2015 | Yeager | A47B 85/06 108/15 |
| 2015/0118010 A1 * | 4/2015 | Krusin | A47B 7/02 414/801 |
| 2018/0092457 A1 * | 4/2018 | Lai | A47B 9/10 |

\* cited by examiner

PNEUMATIC ASSIST ADJUSTABLE TABLE

FIELD

This invention relates to the field of adjustable tables, in particular height adjustable and tilt adjustable tables.

BACKGROUND

Tables of various shapes and sizes are employed in diverse applications and arrangements in professional, business, and living space settings. In order to accommodate a wide variety of uses, a single table is often required to be capable of serving many different functions. Such a table must therefore be adjustable for many different applications and many different users.

Common desirable features of such adjustable tables include a means for adjusting the height of the table top, as well as for providing efficient storage options. For example, individuals who prefer not to remain seated at all times throughout the workday or during a seminar, may opt to alternate between standing and sitting at the table. It is thus advantageous that such multi-purpose tables be vertically adjustable to accommodate these different users in a comfortable position, and to help users perform their tasks more efficiently. It is also beneficial that such multi-purpose tables include a table top capable of tilting or folding so as to allow the table to be conveniently stored while occupying a minimal amount of space. An adjustable height and tilt apparatus to move and secure the table top at a desired height and table top angle is advantageous in that users of all mechanical abilities and strengths may thereby raise or lower the table top slowly and with ease.

One such known adjustable table is moved vertically by the use of pneumatics. These types of tables, also known as counterbalance tables, use pneumatic gas cylinders arranged in a vertical manner to adjust the height of the table top. Pneumatic gas cylinders utilize gas or pressurized air located within an enclosed cylinder to produce a force in a linear direction when actuated by a user. Gas cylinders are known in the art and are used in an extremely wide variety of applications including the automotive, manufacturing, and furniture fields.

Counterbalance tables typically have a control means that actuates the pneumatic system to produce a force on the underside of the table top in order to allow the user to adjust the height of the table. Prior adjustable counterbalance tables have a single control system that activates either a single gas cylinder, or controls two gas cylinders via a master cylinder and a slave cylinder. One disadvantage of such tables is that the lifting cylinders or columns are arranged in close proximity to one another, particular within twelve (12) inches. A further disadvantage of these lifting columns is that they include a physical link such as a metal band that connects the two lifting mechanisms. Such arrangements are cumbersome and overly complex. Furthermore, such a complicated assembly greatly hinders or even eliminates the possibility of incorporating an efficient tilting or folding mechanism on the table assembly. As a result, these tables are expensive and time consuming to produce, which in turn creates a costly final product for the end user.

Therefore, an adjustable table is desired that is simple in design and can be easily adjusted in height and tilt to allow for a wide variety of applications and storage options. A simple, cost-effective design is desirable so as to allow an equally uncomplicated tilting mechanism to be arranged on the table assembly.

SUMMARY

At least some embodiments discussed herein include a table assembly capable of being easily adjusted in height and tilt. An adjustable table in one embodiment includes a table top, a top structure, a base structure, and a control mechanism. The table top includes an underside and defines a front approach side and a rear user side. The top structure is attached to the table top and includes first and second hollow support cylinders arranged parallel to each other. The top structure further includes a top support bar that extends between and perpendicular to the first and second support cylinders and that is configured to support a tilt assembly. The first and second support cylinders extend in a vertical direction downwardly away from the table top. The base structure includes first and second hollow legs that are arranged parallel to each other. The first and second legs extend in the vertical direction and are configured to receive at least a portion of the first and second support cylinders. The control mechanism is operably connected to first and second movement mechanisms that are disposed within a respective support cylinder of the first and second support cylinders and within a respective leg of the first and second legs. The control mechanism is configured to directly control each movement mechanism so as to raise and lower the first and second support cylinders relative to the first and second legs. The tilt assembly is affixed to the underside of the table top and to the top support bar. The tilt assembly is configured to pivot about a pivot axis that runs parallel to the top support bar.

In a further embodiment of the table assembly, the top structure further includes a plurality of first support extensions that extend from a rear surface of the top support bar. The tilt assembly includes a plurality of support ribs that are pivotably coupled to the plurality of first extensions and arranged parallel to each other. The plurality of ribs are affixed to the underside of the table top and are configured to pivot about the pivot axis. Additionally, in further embodiments of the table assembly, the plurality of support ribs includes three support ribs.

In another embodiment of the table assembly, the table assembly further includes a tilt locking assembly. The tilt locking assembly and the control mechanism are affixed to the underside of the table top between two of the plurality of support ribs.

Additionally, in further embodiments of the table assembly, the table assembly further includes a tilt locking assembly configured to lock the table top in a horizontal deployed position and a substantially vertical tilted position.

In some embodiments of the table assembly, the top structure further includes a second support extension extending from a front surface of the top support bar. The tilt locking assembly includes a wireform and a locking handle. The wireform is configured to couple the tilt locking assembly to the second support extension of the top support bar. The locking handle extends towards the rear side of the table top and is configured to be engaged by the user to lock and unlock the table top in the deployed and tilted positions.

In further embodiments of the table assembly, the first and second movement mechanisms each include a lockable gas spring cylinder affixed to an inner bottom surface of the first and second legs.

In another embodiment of the table assembly, the table assembly further includes an upper bushing and a lower bushing fixedly attached to each gas spring cylinder. Each lower bushing is configured to support a respective cylinder of the first and second support cylinders when the table top is in a fully lowered position. Each cylinder of the first and second support cylinders is configured to slide through a respective upper bushing when the first and second support cylinders are raised or lowered.

Additionally, in another embodiment of the table assembly, the table assembly further includes first and second Bowden cables extending from the control mechanism to the first and second movement mechanisms. The first and second Bowden cables are configured to actuate a respective release head of the first and second movement mechanisms.

In some embodiments of the table assembly, the control mechanism includes a release paddle operably connected to each Bowden cable. The release paddle extends towards the rear user side of the table top. The release paddle is configured to be engaged by a user and to pull a first end of an inner cable of each Bowden cable when engaged by a user.

In additional embodiments of the table assembly, the base structure further includes at least one stretcher bar extending from the first leg to the second leg in a direction substantially perpendicular to the first and second legs.

In further embodiments of the table assembly, a distance between the first and second legs in a direction parallel to the top support bar is greater than twelve inches.

Additionally, in another embodiment of the table assembly, the base structure further includes a first foot attached to the first leg and a second foot attached to the second leg. The first and second feet extend substantially perpendicularly relative to the first and second legs.

In some embodiments of the table assembly, the first and second legs are attached off-center to the first and second feet in a direction towards one side of the table top.

The above described features and advantages, as well as others, will become readily apparent to those of ordinary skill in the art by reference to the following detailed description and accompanying drawings.

DETAILED DESCRIPTION

Figure 1:
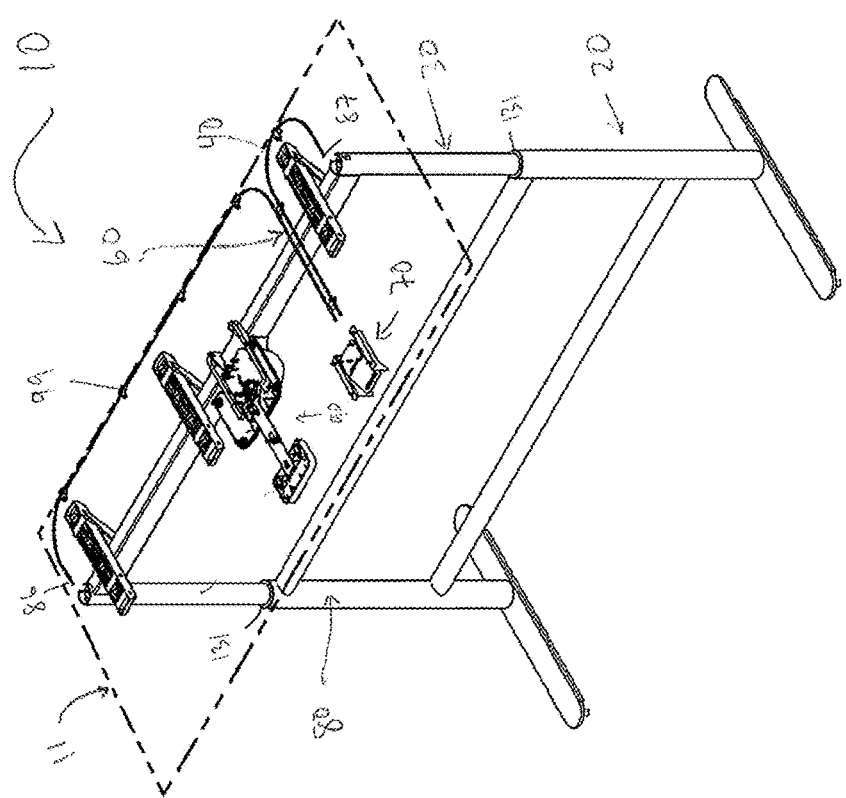
FIG. 1 is a perspective view of a table assembly according to one embodiment of the disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

As used herein, the phrase "substantially vertical" refers to two elements that are between zero (0) and fifteen (15) degrees, inclusive, of being oriented at a ninety (90) degree angle, or perpendicularly, with respect to a ground or floor surface that supports the adjustable table assembly. As used herein, the phrase "substantially perpendicular" refers to two elements that are between zero (0) and fifteen (15) degrees, inclusive, of being perpendicular to one another.

An adjustable table assembly 10 shown in FIG. 1 includes a table top 11, illustrated in phantom, a base structure 20 and a top structure 30. The table assembly 10 further includes a tilting assembly 40 arranged on the top structure 30 capable of adjusting the tilt angle of the table top 11, a height adjustment assembly 60 capable of adjusting the height of the table assembly 10, and a tilt locking mechanism 90 capable of locking the table top 11 in a fully tilted position for storage of the table (as shown in FIGS. 6A and 6B). It can be appreciated that while the table top is shown in FIGS. 6A and 6B in its fully extended position, for optimum storage the table top should be lowered to its lowest position to provide maximum stability of the stowed table.

Figure 5B:
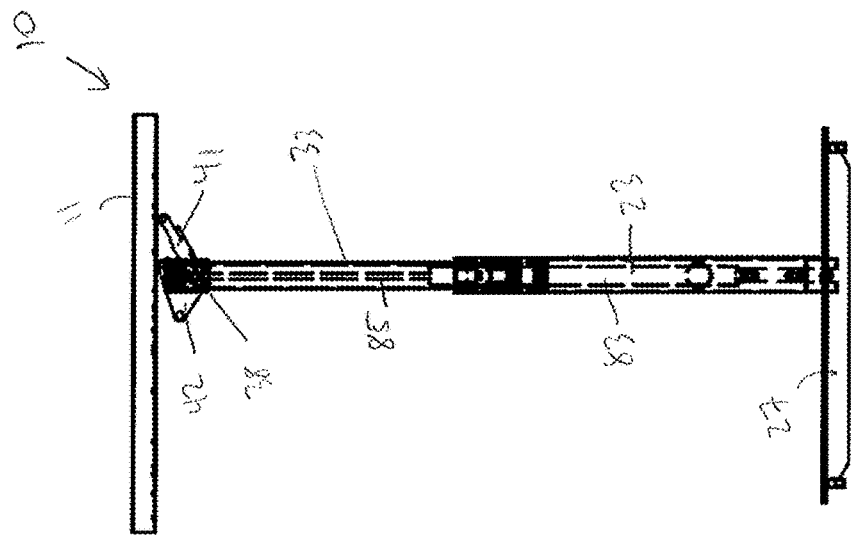
FIG. 5B is a cut-away side view of the table assembly of FIG. 1 in a fully extended and deployed position.
Figure 5A:
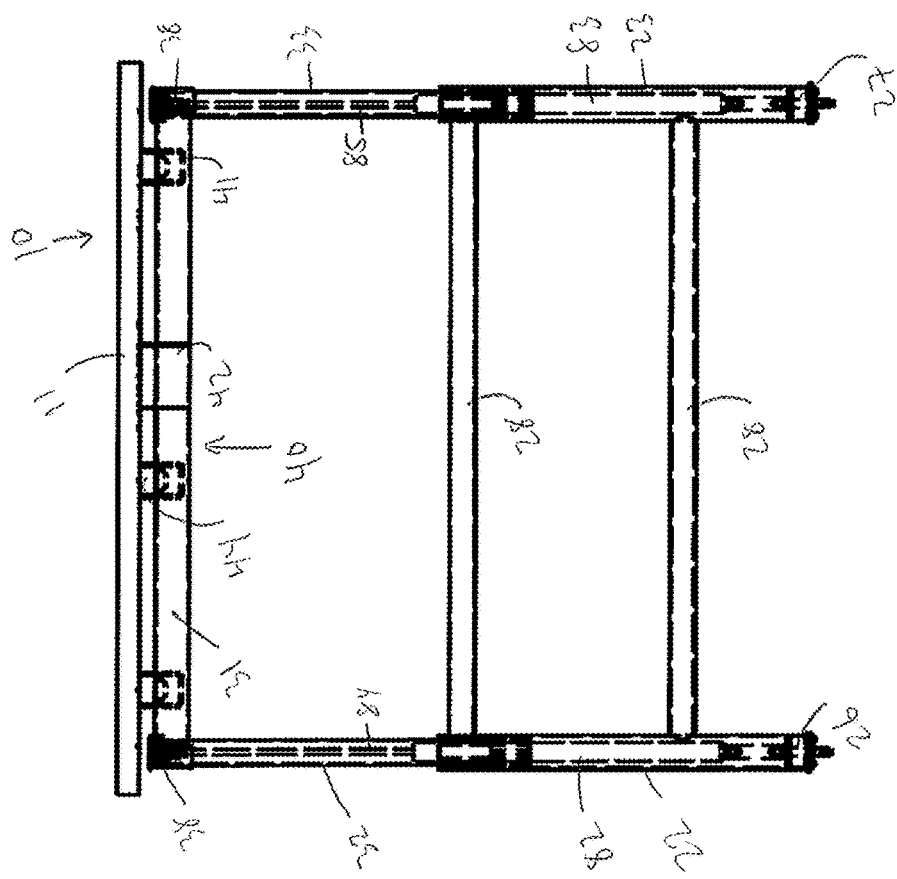
FIG. 5A is a cut-away front side view of the table assembly of FIG. 1 in a fully extended and deployed position.

The base structure 20 is configured to rest on a preferably flat surface or floor to support the rest of the table assembly 10. The top structure 30 is disposed above the base structure 20 and configured to partially support the table top 11 via the tilting assembly 40. The base structure 20 is configured to receive and support the top structure 30 so as to allow the top structure 30 to be raised or lowered by a user to a desired height. The base structure 20 also houses and supports some components of the height adjustment assembly 60. The top structure 30 is configured to support the table top 11, the tilting assembly 40, and the tilt locking mechanism 90, as well as house and support several components of the height adjustment assembly 60. The table assembly 10 is shown in FIGS. 1, 5A, and 5B in a deployed position, with the table top 11, shown in phantom, at an angle of zero degrees (0°). The height of the table assembly 10 is depicted at its highest vertical point in a fully extended position.

The base structure 20 and the top structure 30 consist of a strong, resilient material capable of securely supporting all of the components of the table assembly 10. Preferably, the base structure 20 and the top structure 30 are formed of a metal, such as steel, but can include additional material. The table top 11 can be a variety of materials such as wood or metal, depending on the desired application of the table 10. The base structure 20 and the top structure 30 of a completed table assembly 10 can optionally be painted or have some other type of finish applied to create a more aesthetically appealing table 10.

The table top 11, in a specific embodiment, such as shown in FIGS. 1, 5A-6B, 7, and 13, can be dimensioned at a conventional rectangular table size of twenty-four (24) inches by sixty (60) inches by one-and-a-quarter (1¼) inches. However, the table top 11 can be sized to meet user requirements over a wide range of fields and applications. For example, if larger machining is required of the table assembly 10, the table top 11 can be appropriately sized. Such larger assemblies would require a larger base structure 20 and top structure 30.

Figure 2:
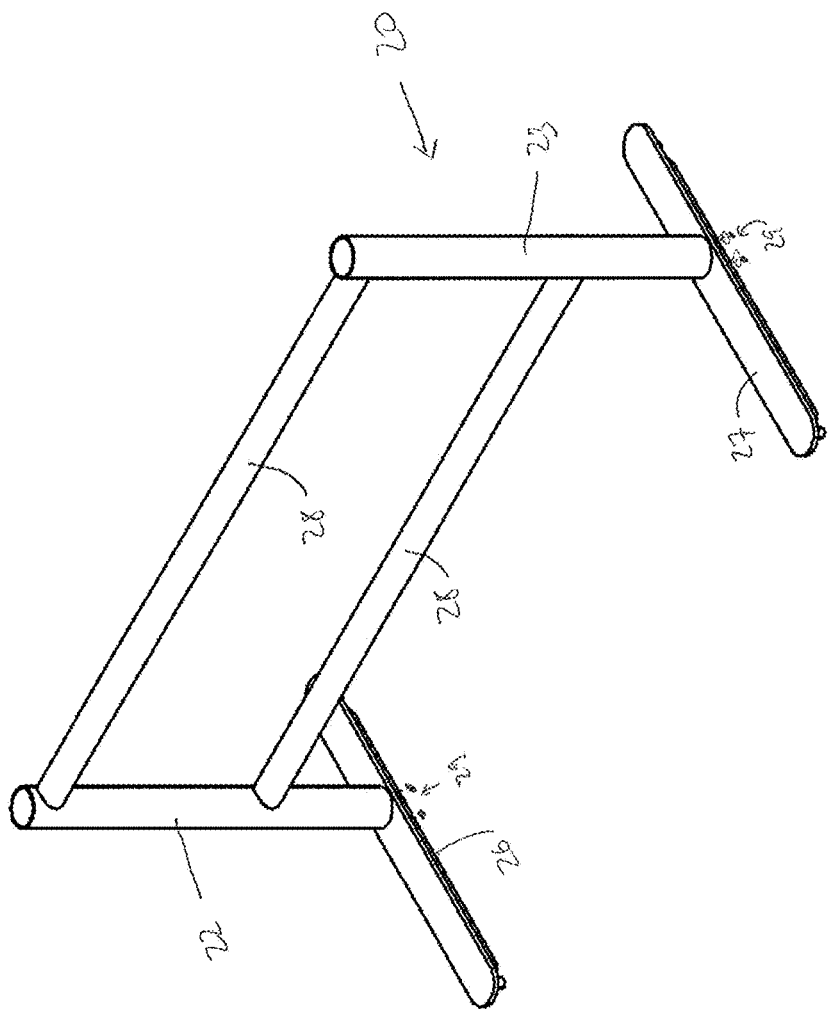
FIG. 2 is a perspective view of a base structure of the table assembly of FIG. 1.

FIG. 2 shows a perspective view of the base structure 20. In one embodiment, the base structure 20 includes a first leg 22 and a second leg 23, a first foot 26 and a second foot 27, and stretcher bars 28. The legs 22, 23 extend upwardly in the vertical direction from the feet 26, 27 and are arranged so as to be parallel with one another. The feet 26, 27 are attached to the bottoms of the legs 22, 23. The stretcher bars 28 extend perpendicularly from the first leg 22 to the second leg 23 and provide extra support and rigidity for the base structure 20. Two stretcher bars 28 are provided to add torsional stability to the base structure 20. In the embodiment described herein, it is preferable that the height or length of the legs 22, 23 is approximately equal to the height or length of the support cylinders 32, 33, which will be described below, although it is conceivable that the legs 22, 23 are longer or shorter depending on the desired application. It is particularly preferable that the height of the legs 22, 23 is between approximately twenty-five (25) inches and thirty (30) inches. The cross-section of the legs 22, 23 is depicted in the figures as circular, although the legs 22, 23 may also have triangular, rectangular, or other cross-sectional profiles. In certain embodiments, the width or diameter of the legs 22, 23 can be between three (3) inches and five (5) inches to create a sturdy base structure upon which the remaining components of the table assembly 10 are supported. The legs 22, 23 are also hollow such that the first leg 22 is capable of receiving a first height adjustment gas cylinder 82 and the second leg 23 is capable of receiving a second height adjustment gas cylinder 83. The hollowed-out structure also allows the first leg 22 to receive a first support cylinder 32 of the top structure 30 and the second leg 23 to receive a second support cylinder 33 of the top structure 30.

Figure 4B:
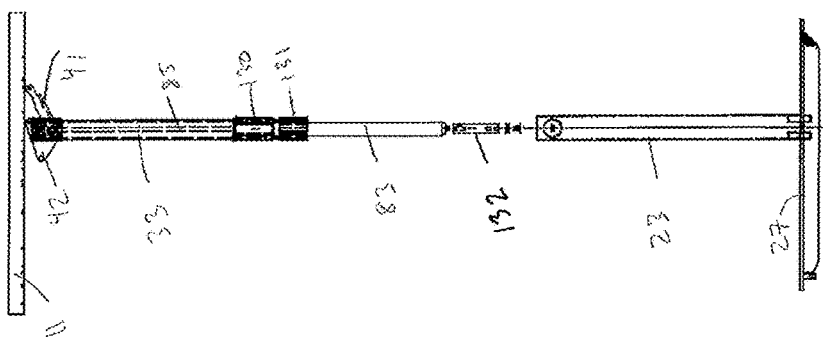
FIG. 4B is a cut-away side exploded view of one side of the base and top structures of FIGS. 2 and 3.
Figure 4A:
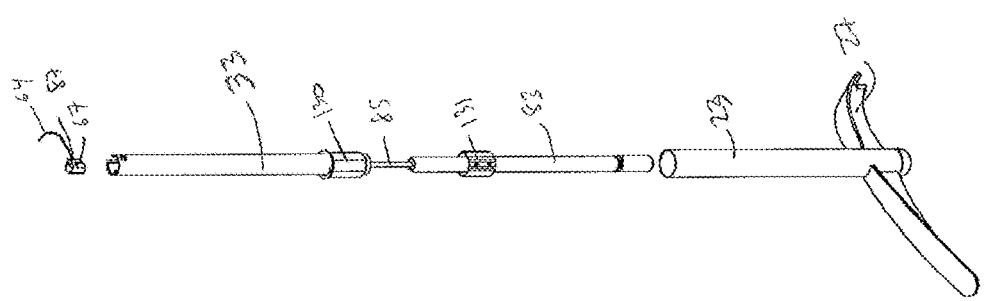
FIG. 4A is a perspective exploded view of one side of the base and top structures of FIGS. 2 and 3.

The feet 26, 27 are disposed on the bottom of the legs 22, 23 such that the legs 22, 23 extend substantially perpendicularly from the feet 26, 27 in the vertical direction. The feet 26, 27 are sized to be long enough and wide enough to fully support the entirety of the table assembly 10 such that the table 10 does not shift or tip over during the adjustment of the height and tilting angle, or during a working operation conducted on the table top 11. Preferably, the width of the feet 26, 27 is equal to the width of the legs 22, 23, although it is possible that the width of the feet 26, 27 is larger or smaller that the legs 22, 23. The feet 26, 27 can be produced separately from the legs 22, 23 as individual pieces that are attached to the bottom of the legs 22, 23 via screws or bolts 29, as shown in FIG. 2. The feet 26, 27 can also be formed integrally with the legs 22, 23 such that the first leg 22 and the first foot 26 form a single piece and the second leg 23 and the second foot 27 form a single piece, as shown in FIGS. 4A and 4B. Preferably, the legs 22, 23 extend from the feet 26, 27 from a point that is offset from the center of the feet 26, 27. This arrangement of the legs 22, 23 relative to the feet 26, 27 creates an optimal weight distribution of the table assembly 10. As a result, the feet 26, 27 remain flat on the supporting surface or floor regardless of the height or tilt angle of the table top 11.

Figure 3:
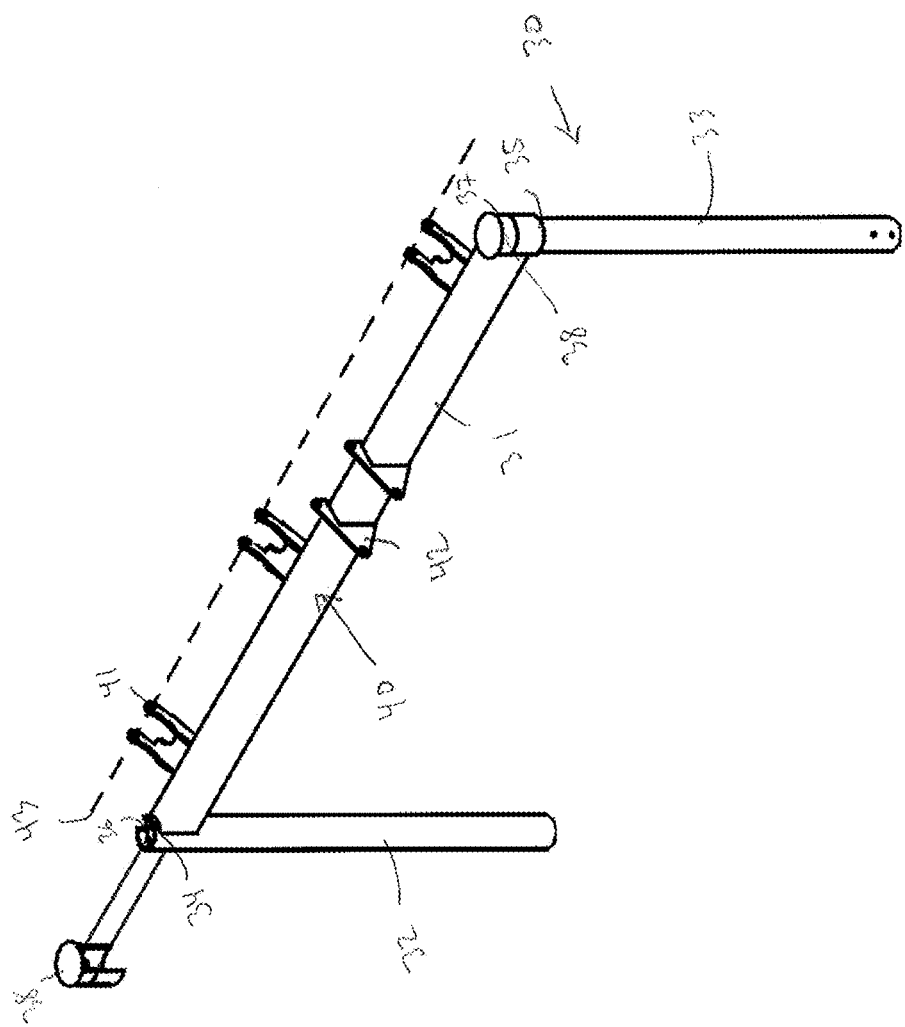
FIG. 3 is a perspective view of a top structure of the table assembly of FIG. 1.

As shown in FIG. 3, the top structure 30 includes a first support cylinder 32, a second support cylinder 33, and a top support bar 31. The support cylinders 32, 33 extend downwardly in the vertical direction from ends of the top support bar 31 towards the top ends of the legs 22, 23 of the base structure 20. The support cylinders 32, 33 are arranged so as to be parallel with one another. The top support bar 31 extends perpendicularly between the support cylinders 32, 33 and provides support for the tilting assembly 40 and the tilt locking mechanism 90.

The top support bar 31 also includes a plurality of first support extensions 41 and a second support extension 42. The plurality of first support extensions 41 generally extend outwardly and upwardly from a first, back side of the top support bar 31, and the second support extension 42 generally extends outwardly and upwardly from a second, opposite front side of the top support bar 31, as shown in FIG. 3. The plurality of support extensions 41, which will be described in more detail below, are configured to pivotably support ribs 44 of the tilting assembly 40 which in turn support the table top 11, thus allowing the table top 11 to pivot about a pivot axis 43. In the embodiment described herein and shown in FIG. 3, the plurality of first support extensions 41 includes three support extensions configured to support three support ribs 44, although a different number of extensions is feasible depending on the table size and weight requirements. The second support extension 42 is configured to support the tilt locking mechanism 90.

FIGS. 4A and 4B show exploded views of one leg 23, support cylinder 33, and gas cylinder 83. Each leg 22, 23 is configured to receive a respective support cylinder 32, 33, and the support cylinders 32, 33 preferably have the same cross-section as the legs 22, 23. The width or diameter of each support cylinder 32, 33 is sized to be slightly less than the width or diameter of the respective leg 22, 23. This allows the support cylinders 32, 33 to be inserted into the hollowed-out legs 22, 23. As a result, the support cylinders 32, 33 are able to securely and smoothly slide within the legs 22, 23 during a height adjustment of the table 10. The support cylinders 32, 33 are also hollow such that they encase upper portions of the gas cylinders 82, 83 that extend through the support cylinders 32, 33 to first and second release heads 66, 67 of the height adjustment assembly 60.

FIGS. 1 and 4B-8 show the height adjustment assembly 60. In the embodiment described herein, the height adjustment assembly 60 generally includes a paddle assembly 70 (which can also be referred to as a control mechanism), and a vertical height adjustment cylinder assembly 80 (which can also be referred to as movement mechanisms). In this embodiment, a first cable 62 and a second cable 64 extend from the paddle assembly 70 to the first and second release heads 66, 67, respectively. The first and second release heads 66, 67 are threadedly attached to and actuate the first gas cylinder 82 and the second gas cylinder 83, respectively.

Figure 6C:
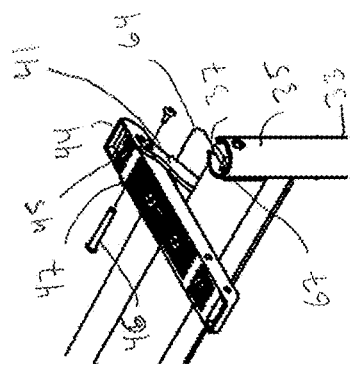
FIG. 6C is a perspective view of a portion of a tilt assembly of the table assembly of FIG. 1.
Figure 6B:
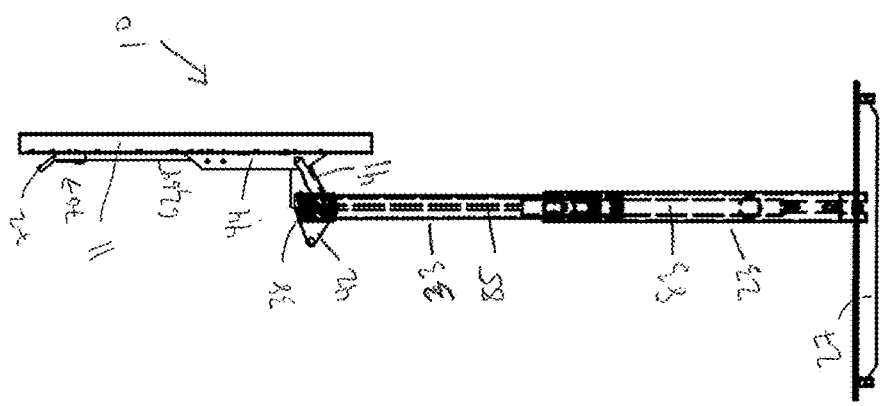
FIG. 6B is a cut-away side view of the tilt assembly of the table assembly of FIG. 1 in a fully extended and tilted position.
Figure 6A:
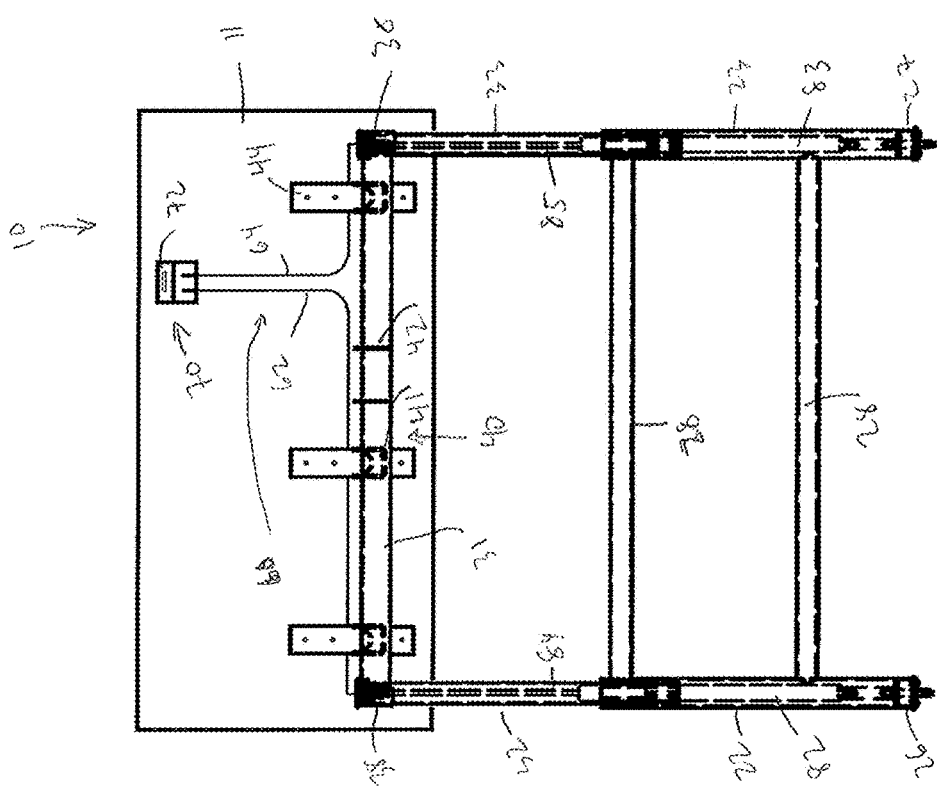
FIG. 6A is a cut-away front side view of the tilt assembly of the table assembly of FIG. 1 in a fully extended and tilted position.
Figure 7:
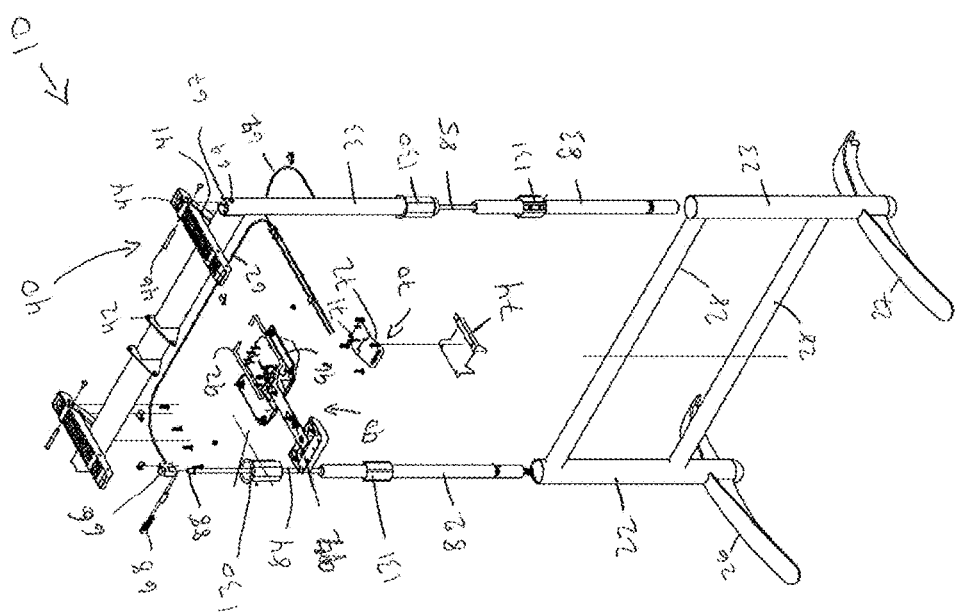
FIG. 7 is an exploded perspective view of the table assembly of FIG. 1.

With specific reference to FIGS. 3, 6C, and 7, it can be seen that the support cylinders 32, 33 each open at the top of the hollow cylinder and include a first and second top end portion 34, 35. The top end portions 34, 35 are approximately flush with the top surface of the top support bar 31 but may extend slightly beyond the top surface of the bar 31. The first top end portion 34 includes a first slit 36 and the second top end portion 35 includes a second slit 37. The slits 36, 37 along with the openings at the top of the support cylinders 32, 33 enable the release heads 66, 67 of the height adjustment assembly 60 to be disposed partially inside the top end portions 34, 35 of the support cylinders 32, 33. The release heads 66, 67 are mounted inside the top end portions 34, 35 with hex drive screws 68, 69. The top end portions 34, 35 can optionally be covered with end caps 38.

FIGS. 1 and 6C further illustrate the tilting assembly 40. In this particular embodiment, the tilting assembly 40 has three support ribs 44 and three support extensions 41. The support ribs 44 may be formed of a composite material capable of withstanding the cantilever loads of a typical table, although other materials may conceivably be utilized. Preferably, the support ribs 44 are sized such that they extend approximately halfway towards the rear user side of the table top 11, and such that the width of the support ribs 44 is relatively small in comparison to the width of the table assembly 10. It can be appreciated that the minimalistic dimensions of the support ribs 44 allow for an equally minimalistic height adjustment assembly 60 to be mounted to the top structure 30. The support ribs 44 can also be constructed as semi-hollow pieces, for example formed by injection molding, to further minimize the size of the tilting assembly 40.

Each of the plurality of support extensions 41 includes two mounting holes 45 and each support rib 44 includes two mounting openings 47. A barrel nut and screw 46 extend through the mounting holes 45 and the mounting openings 47 so as to pivotably couple each support rib 44 to a respective support extension of the plurality of support extensions 41. As a result, the support ribs 44 are pivotable about the pivot axis 43. The support ribs 44 are fastened to the underside of the table top 11 with screws and configured to fully support the weight of table top 11 in both the deployed and tilted positions.

The tilt locking mechanism 90, as illustrated in FIGS. 1 and 7 is mounted to the underside of the table top 11 and is configured to lock the table top 11 in either the deployed or tilted positions. The tilt locking mechanism 90, at least in the embodiment illustrated in FIGS. 1 and 7, includes a lock wireform 92, a locking handle 94, and a cover 96. The lock wireform 92 is coupled to the second support extension 42 in order to allow the tilt locking mechanism 90 to pivot about the point at which it connects to the second support extension 42. The locking handle 94 protrudes outwardly from the body of the tilt locking mechanism 90 towards the portion of the table top 11 that faces the user. The locking handle 94 is configured to be adjusted from an engaged to a disengaged position. In the disengaged position, the tilt locking mechanism 90 is unlocked and the user is free to adjust the table top 11 between a tilted and deployed position. The cover 96 is placed over the outside of the tilt locking mechanism 90 to preserve the assembly from environmental hazards as well as provide a more aesthetic appearance.

The locking mechanism 90 just described may be similar to the mechanism disclosed in U.S. Pat. No. 8,869,715 B2, entitled "Tilting Tabletop Mechanism," the entire disclosure of which is incorporated herein by reference. The locking handle 94 may thus be constructed in a manner similar to the handle 192 in that application.

Figure 8:
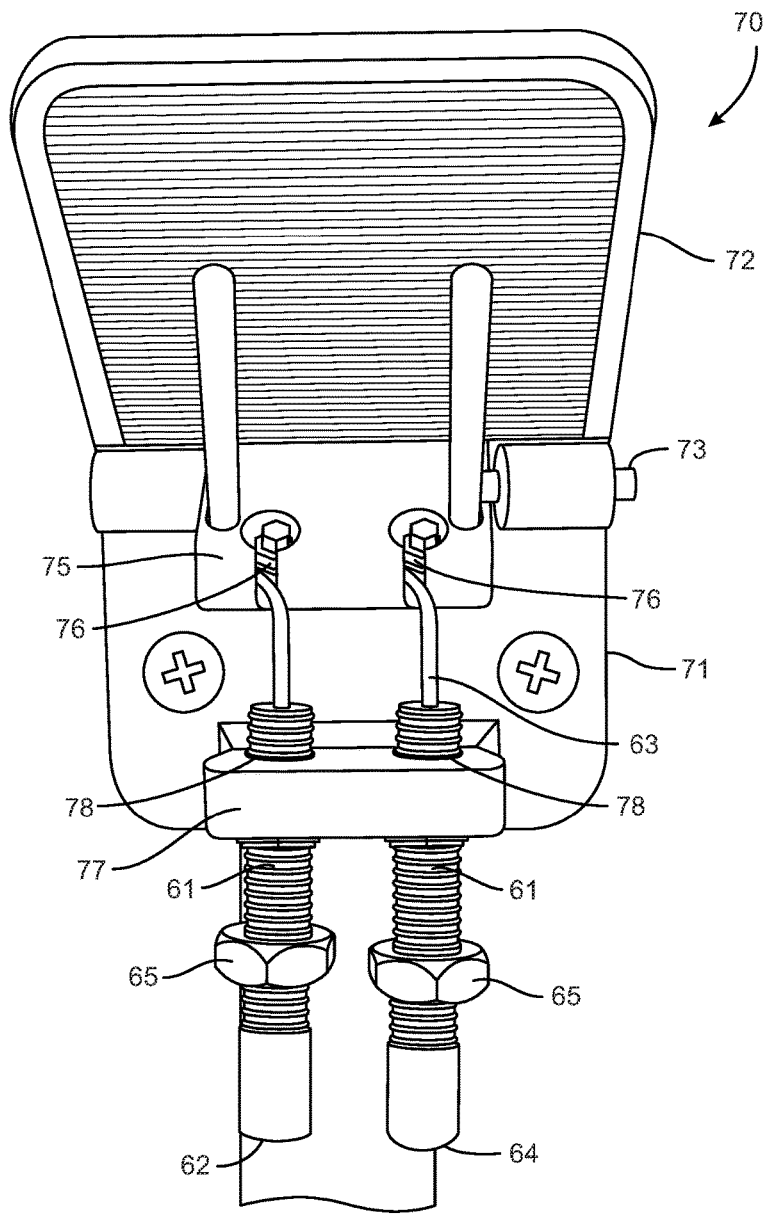
FIG. 8 is a paddle assembly of the table assembly.

The paddle assembly 70 is shown in FIGS. 1 and 7 and in greater detail in FIG. 8. In this embodiment, the paddle assembly 70 includes a paddle base 71, a release paddle 72, and a hinge 73. The paddle base 71 is fixedly attached to the underside of the table top 11 with appropriate screws such that the paddle base 71 is flush with the underside of the table top 11. The release paddle 72 spaced from the paddle base 71 in a direction toward the rear of the table 10 so as to allow the user to actuate the release paddle 72 in an upward direction. The hinge 73 extends horizontally through the paddle base 71 and a middle portion of the release paddle 72 is attached to an exposed portion of the hinge 72 such that the release paddle 72 can pivot about the hinge 73 with respect to the paddle base 71.

According to FIG. 8 in particular, the paddle assembly 70 further includes cradle member 75 having two cradles 76 and a threaded member 77 having two threaded holes 78. The threaded holes 77 are configured to receive threaded ends 61 of the cables 62, 64 and are secured against the threaded ends 61 with jam nuts 65. The two cradles 76 are configured as recesses formed in the cradle member 75 and have elongated slots extending away from the recesses toward the threaded member 77. First inner cable extensions 63 of the cables 62, 64 extend out of the cables 62, 64, and the ball tips of the first cable extensions 63 securely rest in the recesses of the cradles 76. Thus, when the release paddle 72 is moved in an upward direction by the user, the cradle member 75 exerts a pulling force on the first cable extensions 63, and because the ends of the cables 62, 64 are fixed in the threaded member 77, pulls the first cable extensions 63 a small distance out of the cables 62. 64. The first cable extensions 63 are returned to their starting positions after the user disengages the release paddle 72 by a spring force within the gas cylinders 82, 83. The paddle assembly 70 may be covered by a paddle cover 74.

In the embodiment described herein and shown in FIGS. 1 and 7, the cables 62, 64 discussed above extend from the paddle plate 70 along the underside of the table top 11 towards the front or approach side of the table top 11 and then diverge in opposite directions towards a respective support cylinder 32, 33. The cables 62, 64 can be secured to the underside of the table top 11 using clips 99 and can optionally be covered with a wire manager. The cables 62, 64, at least in one embodiment, are Bowden cables that are flexible cables capable of transmitting a force over a distance by the movement of an inner cable relative to a hollow, stationary outer cable housing. The inner cable of each cable 62, 64 extends outwardly from the two opposite ends of the cables 62, 64, wherein the first cable extensions 63 extend out of the cables 62, 64 and couple to the paddle assembly 70, and second cable extensions 86, 87 extend out of the cables 62, 64 at an opposite end and couple to the release heads 66, 67. When the release paddle 72 is activated by the user, the release paddle 72 exerts a pulling force on the first cable extensions 63 which pulls the inner cable located within each Bowden cable 62, 64 in the direction of the paddle assembly 70 at the end of the cables 62, 64. As a result, the second cable extensions 86, 87 are also pulled in this direction, which in turn actuate the release heads 66, 67. The actuation of the release heads 66, 67 in turn actuates the gas cylinders 82, 83, allowing the user to raise or lower the table assembly 10.

With reference to FIGS. 4A-6B and FIG. 7, the cylinder assembly 80 is illustrated and described herein in more detail. The cylinder assembly 80, in at least one embodiment, includes two lockable gas spring cylinders 82, 83 each configured to adjust the height of the table assembly 10. The gas cylinders 82, 83 are mounted within the hollowed-out legs 22, 23 and sized to allow the support cylinders 32, 33 to envelop the gas cylinders 82, 83 when the table assembly 10 is lowered to a fully retracted position. FIGS. 5A-6B in particular show the manner in which the gas cylinders 82, 83 are mounted within the legs 22, 23 and support cylinders 32, 33. The gas cylinders 82, 83 are securely fastened to the bottom of the hollowed-out legs 22, 23 with screws or other suitable means.

The gas cylinders 82, 83 are preferably pneumatic cylinders, and particularly preferably lockable pneumatic spring cylinders. Each gas cylinder 82, 83 is configured in the conventional way with a stroke rod 84, 85 that protrudes from the top end of the gas cylinder 82, 83. One of ordinary skill in the art would appreciate the manner in which such conventional gas cylinders 82, 83 operate. The stroke rod 84, 85 is driven upward via an upward force produced by high pressure gas within the cylinders and can also be easily lowered as a consequence of the high-pressure gas. One exemplary lockable gas spring system that may be used is the Bansbach Lockable Gas Spring Cylinder, available from Bansbach Easylift GmbH, which utilizes a release head, a Bowden cable, and nitrogen gas within the cylinder to actuate the stroke rod. By using such a pneumatic lifting system, only minimal application or release of force is required from the user to lift or lower the table assembly 10.

Figure 9:
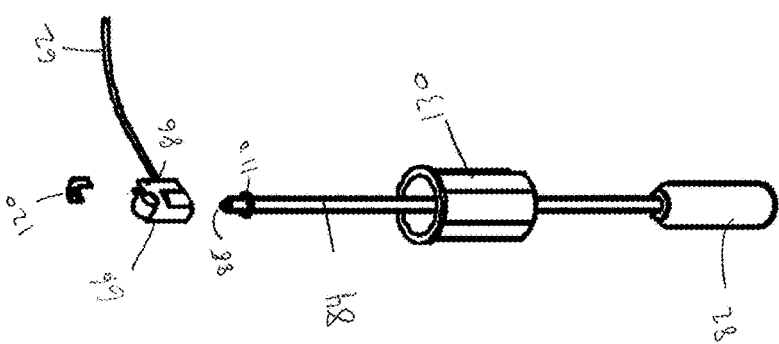
FIG. 9 is an exploded perspective view of a cylinder assembly of the table assembly of FIGS. 4A-6B and 7.
Figure 10:
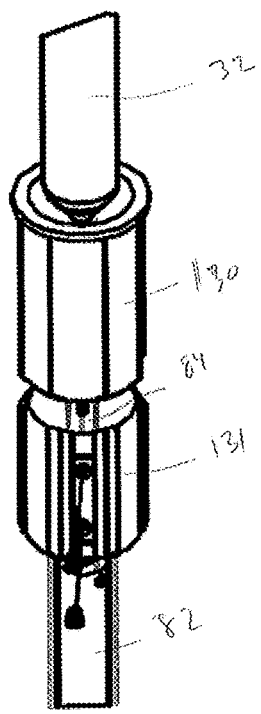
FIG. 10 is a perspective view of the cylinder assembly of in FIGS. 4A-6B, 7, and 9.
Figure 11:
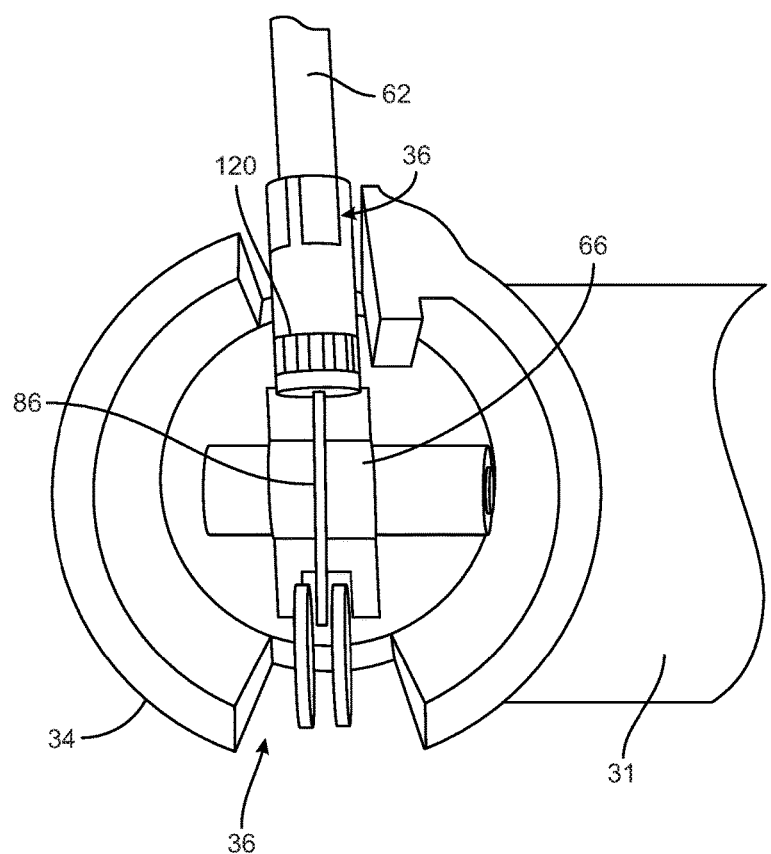
FIG. 11 is a top-down plane view of a release head of the table assembly.
Figure 12:
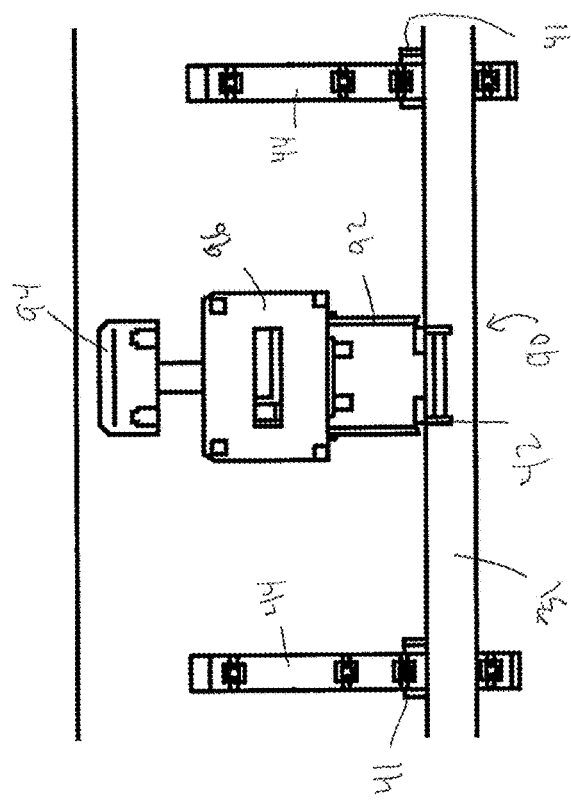
FIG. 12 is a front side view of a tilt locking mechanism of the table assembly as shown in FIGS. 6A and 6B in a tilted position.
Figure 13:
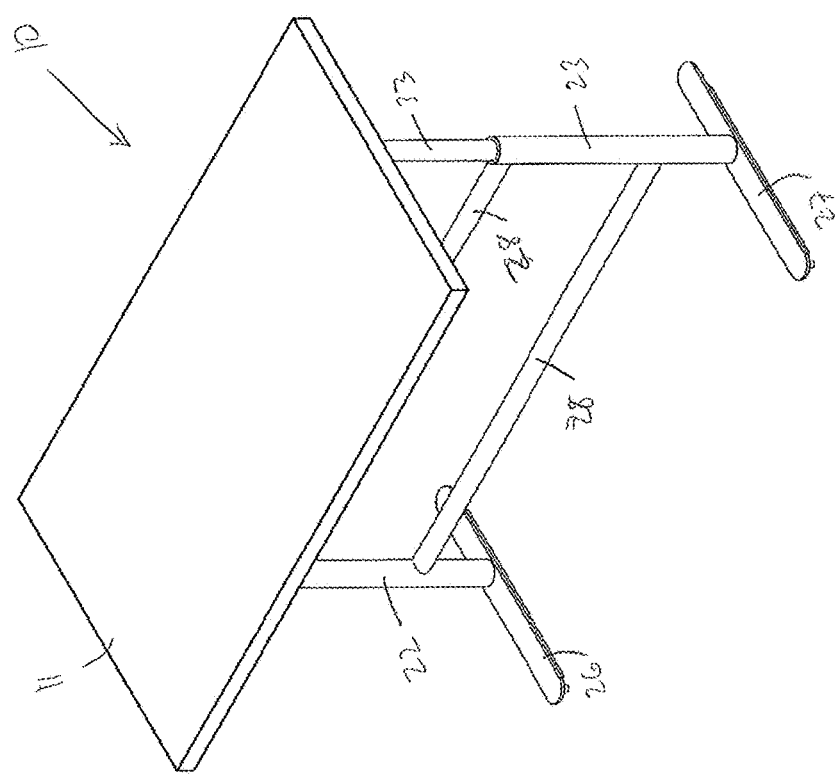
FIG. 13 is a perspective view of the table assembly of FIG. 1 in an assembled state.

Each stroke rod 84, 85 includes a release pin 88 and jam nut 110 at the upper end of the stroke rod 84, 85. FIG. 9 shows in greater detail the manner in which the release heads 66, 67 interact with the release pins 88. The end of each stroke rod 84, 85 is threaded so that it may be fastened to the respective release head 66, 67 located above it. As illustrated in FIG. 9, the end of each stroke rod 84, 85 is screwed into the bottom of the respective release head 66, 67 until the release pin 88 engages with the release head 66, 67. The jam nut 110 is then tightened to secure the stroke rod 84, 85 to the release head 66, 67. The cables 62, 64 are fixed to the upper rear portion of the release heads 66, 67 via a wire clip 120. The length of the stroke rods 84, 85 is less than the length of the support cylinders 32, 33 such that when the stroke rods 84, 85 are fully extended, at least a portion of the bottom of the support cylinders 32, 33 remains within the legs 22, 23.

In order to ensure smooth adjustment of the table assembly 10, upper bushings 130 and lower bushings 131 are disposed within the legs 22, 23, as can be seen in FIGS. 4A, 4B, 7, 9, and 10, to center and support the support cylinders 32, 33 and the gas cylinders 82, 83. The lower bushings 131 can be fastened to the outside of the gas cylinders 82, 83 with screws. It can be appreciated that the position of the lower bushings 130 define the lowest point to which the table assembly 10 can be lowered. For example, if the lower bushings 130 are fastened to the gas cylinders 82, 83 at the positions shown in FIG. 7, the support cylinders 32, 33 would only be permitted to lower to that point when the user lowers the table assembly 10. However, placement of the lower bushings 130 at the bottom of the gas cylinders 82, 83 would enable the table assembly 10 to lower almost completely such that the top support bar 31 is proximate to the upper stretcher bar 28. As such, the table assembly 10 can be adjusted or modified to meet the needs of an extensive variety of applications.

In addition, spacers 132 may be provided between the gas cylinders 82, 83 and the bottom of the legs 22, 23. The spacers 132 support the cylinder and can be sized as desired to support the gas cylinders at different heights from the bottom of the legs, thereby adjusting the overall extended height of the table top.

The upper bushings 130 include a small lip which overhangs the top circumferential edge of each leg 22, 23 so as to nearly seal the interior of the legs 22, 23 from the environment when the support cylinders 32, 33 are inserted. The upper bushings 130 can optionally be adhered to the inside of the legs 22, 23, press fit into the legs 22, 23, or mounted in some other suitable manner. The upper bushings 131 provide a clearance fit for the support cylinders 32, 33 to slide into and out of the legs 22, 23 when the height of the table assembly 10 is adjusted.

Generally, the height and/or tilt angle of the table assembly 10 is adjusted by the user activating the release paddle 72 to alter the height of table assembly 10 and/or activating the tilt locking mechanism 90 to alter the tilting angle of the table assembly 10. In order to adjust the tilting angle of the table assembly 10 from a deployed position (as shown in FIGS. 1, 5A, and 5B) to a tilted position (as shown in FIGS. 6A and 6B), the user activates the locking handle 94 of the tilt locking mechanism 90 so as to disengage the locking mechanism 90. The table top 11 is then tilted upwards via the support ribs 44 and the tilt locking mechanism 90 about the pivot axis 43 to an angle of ninety degrees (90°) or slightly more. Once the table top 11 is adjusted to approximately ninety degrees (90°), the user can reactivate the tilt locking mechanism 90 via the locking handle 94 to lock the table top 11 in this position. In order to adjust the tilting angle of the table assembly 10 from a tilted position to a deployed position, the locking handle 94 is used to unlock the locking mechanism 90 and the table top 11 is tilted downwards about the pivot axis 43 to an angle of zero degrees (0°). Once the table top 11 is adjusted to zero degrees (0°), the user can reactivate the tilt locking mechanism 90 via the locking handle 94 to lock the table top 11 in this position.

In order to adjust the height of the table assembly 10, the user activates the release paddle 72 in order to pull the inner cables of the cables 62, 64 and activate the release heads 66, 67, which in turn activate the gas cylinders 82, 83. Once the gas cylinders 82, 83 are activated, the user can either raise or lower the table top 11 from its current position to a desired height. Preferably, the table top 11 is capable of being adjusted between a height of twenty-five (25) inches and forty-five (45) inches in order accommodate a variety of applications and user heights. More particularly, the table top 11 can be adjusted between a height of twenty-nine (29) inches and forty-two (42) inches. Once the table top 11 is adjusted to a desired height, the user releases the release paddle 72 in order to allow the inner cables of the cables 62, 64 to return to their initial positions. This action deactivates the release heads 66, 67 which in turn deactivate the gas cylinders 82, 83, thus locking the table top 11 at the desired height.

It can be appreciated that the arrangement of the tilting assembly 40, cylinder assembly 80, and tilt locking mechanism 90 described herein streamline and simplify the adjustable table arrangement. In particular, as discussed above, the two gas cylinders 82, 83 are controlled individually, as opposed to prior cylinder assemblies in which only one gas cylinder (a master cylinder) is directly controlled and the other a slave cylinder with no controls, requiring closely spaced lifting columns, typically within twelve (12) inches of each other. The arrangement of the present assembly allows for lifting columns (for example the legs 22, 23 and support cylinders 32, 33 discussed above) that are spaced further apart, creating a stronger, more robust overall structure.

It can be further appreciated that individual control of the gas cylinders 82, 83 eliminates the requirement of prior assemblies that the lifting columns be connected with a physical link (for example, a metal band). Additionally, the minimalistic setup of the height adjustment assembly 60, paddle assembly 70, and cylinder assembly 80 occupies a small amount of space on the base and top structures 20, 30. As a result of this arrangement, the top structure 30 can easily accommodate the simplified tilt assembly 40 and tilt locking mechanism 90 discussed above. In particular, the top structure 30 is capable of supporting, as one such example, a Versteel Slim Tilt Table Top System, which provides for an uncomplicated means of adjusting a table top between tilted and deployed positions. Accordingly, due to the many advantages of the present arrangement, the complexity, weight, production time, and ultimately the cost, of the table assembly are significantly reduced.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table assembly, comprising:
   a table top including an underside and defining a front approach side and rear user side;
   a top structure attached to the table top and including first and second hollow support cylinders arranged parallel to each other, and a top support bar extending between and perpendicular to the first and second support cylinders, the first and second support cylinders extending in a vertical direction downwardly away from the table top;
   a tilt assembly affixed to the underside of the table top and to the top support bar, the tilt assembly configured and operable to pivot about a pivot axis that extends parallel to the top support bar to pivot the table top relative to the top support bar;
   a base structure including first and second hollow legs arranged parallel to each other, the first and second legs extending in the vertical direction and configured to receive at least a portion of a corresponding one of the first and second support cylinders;
   first and second movement mechanisms disposed within a support cylinder of a corresponding one of the first and second support cylinders and within a corresponding one of the first and second legs; and
   a control mechanism operably connected to the first and second movement mechanisms configured and operable to directly and simultaneously control each movement mechanism so as to raise and lower the first and second support cylinders relative to the first and second legs.

2. The table assembly according to claim 1, wherein:
   the top structure further includes a plurality of first support extensions extending from the top support bar;
   the tilt assembly includes a plurality of support ribs pivotably coupled to the plurality of first support extensions and arranged parallel to each other; and
   each of the plurality of support ribs is affixed to the underside of the table top and configured to pivot about the pivot axis.

3. The table assembly according to claim 2, wherein the plurality of support ribs includes three support ribs.

4. The table assembly according to claim 2, further comprising a tilt locking assembly configured and operable to lock the tilt assembly in a pre-determined angular position, wherein the tilt locking assembly and the control mechanism are affixed to the underside of the table top between two of the plurality of support ribs.

5. The table assembly according to claim 1, further comprising a tilt locking assembly configured and operable to lock the tilt assembly in a position in which the table top is in a horizontal position relative to the first and second legs and to lock the tilt assembly in a position in which the table top is in a substantially vertical position relative to the first and second legs.

6. The table assembly according to claim 5, wherein:
   the top structure further includes a second support extension extending from a front surface of the top support bar;
   the tilt locking assembly includes a wireform and a locking handle;
   the wireform is configured to couple the tilt locking assembly to the second support extension of the top support bar; and
   the locking handle is configured and arranged relative to the table top to be engaged by the user to lock and unlock the table top in either of the horizontal and vertical positions.

7. The table assembly according to claim 1, wherein the first and second movement mechanisms each include a lockable gas spring cylinder affixed to a corresponding one of the first and second legs.

8. The table assembly according to claim 7, further comprising an upper bushing and a lower bushing, each lower bushing configured to support a respective cylinder of the first and second support cylinders when the table top is in a fully lowered position, wherein each cylinder of the first and second support cylinders is configured to slide through a respective upper bushing when the first and second support cylinders are raised or lowered.

9. The table assembly according to claim 7, wherein:
   each gas spring cylinder includes:
      a stroke rod extending from said gas spring cylinder with an end thereof connected to a corresponding first and second support cylinder adjacent the end of the support cylinder opposite the gas spring cylinder; and
      a release pin accessible at said end of the stroke rod and operable to release gas pressure within the gas spring cylinder; and
   the control mechanism includes:
      first and second release heads mounted within a corresponding first and second support cylinder adjacent the corresponding release pin, each release head configured to actuate the corresponding release pin to release the gas pressure; and
      first and second Bowden cables extending from the control mechanism to a respective first and second release head and configured to actuate a respective release head.

10. The table assembly according to claim 9, wherein:
    the control mechanism includes a release paddle operably connected to each Bowden cable, the release configured and arranged to be accessible to a user when the table top is in either the horizontal or vertical position; and
    the release paddle is configured to be engaged by a user and to pull a first end of an inner cable of each Bowden cable when engaged by a user.

11. The table assembly according to claim 1, wherein the base structure further includes at least one stretcher bar extending from the first leg to the second leg in a direction substantially perpendicular to the first and second legs.

12. The table assembly according to claim 1, wherein a distance between the first and second legs in a direction parallel to the top support bar is greater than twelve inches.

13. The table assembly according to claim 1, wherein:
 the base structure further includes a first foot attached to the first leg and a second foot attached to the second leg; and
 the first and second feet extend substantially perpendicularly relative to the first and second legs.

14. The table assembly according to claim 13, wherein the first and second legs are attached to the first and second feet off-center in a direction towards one side of the table top.

* * * * *